United States Patent
Lahiri

(10) Patent No.: US 8,441,218 B2
(45) Date of Patent: May 14, 2013

(54) ELECTRICAL REGENERATIVE BRAKING

(75) Inventor: Anirban Lahiri, Eindhoven (NL)

(73) Assignee: NXP B.V., Eindhoven (NL)

(*) Notice: Subject to any disclaimer, the term of this patent is extended or adjusted under 35 U.S.C. 154(b) by 415 days.

(21) Appl. No.: 12/810,810

(22) PCT Filed: Oct. 31, 2008

(86) PCT No.: PCT/IB2008/054533
§ 371 (c)(1),
(2), (4) Date: Jun. 25, 2010

(87) PCT Pub. No.: WO2009/087501
PCT Pub. Date: Jul. 16, 2009

(65) Prior Publication Data
US 2010/0277110 A1    Nov. 4, 2010

(30) Foreign Application Priority Data
Jan. 2, 2008 (EP) .................... 08100027

(51) Int. Cl.
*H02P 3/18* (2006.01)
(52) U.S. Cl.
USPC .................... 318/376; 318/375; 318/532
(58) Field of Classification Search ............ 318/376, 318/375, 252, 532, 400.26, 700
See application file for complete search history.

(56) References Cited

U.S. PATENT DOCUMENTS

| | | | |
|---|---|---|---|
| 3,877,142 A * | 4/1975 | Hamano et al. ........... 29/596 |
| 4,015,189 A | 3/1977 | Gorden | |
| 4,181,875 A | 1/1980 | Kohzai et al. | |
| 5,170,111 A | 12/1992 | Sugiura | |
| 5,986,370 A | 11/1999 | Cheng | |
| 6,255,754 B1 | 7/2001 | Savage et al. | |
| 2003/0010584 A1 | 1/2003 | Chen | |

FOREIGN PATENT DOCUMENTS

| | | |
|---|---|---|
| DE | 27 49 820 A1 | 5/1978 |
| DE | 299 21 874 U1 | 4/2000 |
| GB | 1323609 | 7/1973 |
| WO | 01/42079 | 6/2001 |

OTHER PUBLICATIONS
International Search Report and Written Opinion for International Patent Appln. No. PCT/IB2008/054533 (Nov. 11, 2009).

* cited by examiner

*Primary Examiner* — Karen Masih

(57) ABSTRACT

This invention relates to an electrical regenerative brake (100) with a rotating brake coil (10) which is mounted on a wheel (14) of a vehicle, whereby a magnetic field (18) is fed in the coil (10). In order to allow effective regenerative braking (100) at low speeds and to provide a significant increase in power saving, this invention proposes that the permanent magnet (13) producing the magnetic field (18) is placed in the inner space of at least one additional coil (11, 12), whereby the brake has an electric circuit (22) which contains the rotating brake coil (10) and the additional coil (11, 12) as elements.

20 Claims, 5 Drawing Sheets

ELECTRICAL REGENERATIVE BRAKING

FIELD OF INVENTION

The present invention relates to an electrical regenerative braking with a rotating brake coil which is mounted on a wheel of a vehicle, whereby a magnetic field is fed in the coil.

The present invention further relates to a method according to the preamble of claim 10.

BACKGROUND OF THE INVENTION

Electrical regenerative brakes are an essential component in all modem electric and hybrid vehicles. During regenerative braking the kinetic energy of the vehicle is converted into electrical energy and stored for future use. Such energy savings have become important due to increasing fuel costs and stringent automobile emission norms. Added to this is the increasing load of in-car electronics. HVAC (Heating, Ventilation and Air-Conditioning), infotainment devices, and safety & comfort systems contribute towards the majority of the electrical power consumption in cars. Regenerative braking is always used in combination with conventional braking systems.

In an electrical regenerative braking coils and permanent magnets are placed in the wheel of a vehicle. When the brakes are applied the circuit through the coils is completed. According to Faraday's law a current is generated in the coils due to the rotational motion of the wheel. The current thus generated opposes the motion of the coils in the wheels according to Lenz's law, hence producing a braking effect. At the same time the current in the circuit is used to charge the batteries/super-capacitors.

It may be observed that in existing electrical regenerative brakings the magnetic field existing across the coils remain constant with time. Due to this reason the current solutions for regenerative braking are not effective if used at lower speeds. Also the energy savings obtained are suboptimal.

OBJECT AND SUMMARY OF THE INVENTION

Starting from the disadvantages and shortcomings as described above and taking the prior art as discussed into account, the object of the present invention is to allow effective regenerative braking at low speeds and to provide a significant increase in power savings.

The object of the present invention is achieved by an electrical regenerative braking comprising the features of claim 1 as well as by a method comprising the features of claim 10.

Advantageous embodiments and expedient improvements of the present invention are disclosed in the dependent claims.

According to the invention the magnet producing the magnetic field is in the inner space of at least one additional coil, whereby the braking has an electric circuit which contains the rotating brake coil and the additional coils as elements.

The basic idea of the invention is the presence of additional coils and electromagnetic feedback. Apart from the brake coils which are traditionally used for regenerative braking, additional coils are placed around the magnet in 1. A portion of the current produced due to regenerative braking is passed the current through this additional coil resulting in feeding back. The current through this coil is regulated to adjust the strength of the magnetic field through the wheels which is used for regenerative braking. A rectification circuit and a controller block is responsible for regulating the current through the additional coils as well deciding what combination of regenerative and conventional braking to use at a particular instance depending on the pressure applied on the brake pedal.

According to the invention a current is generated in the braking coils when the brakes are applied. It may be noted, that the magnetic field at that instance is only due to the permanent magnetic field. Once the current is driven through the circuit the electromagnets created by the additional coils around the magnet become operational. Thus, the magnetic field around the coils attached to the wheels start increasing. This in turn generates a greater current in the coils according to Farraday's law, thus producing a greater charging current for the batteries or super-capacitors.

The advantage of the invention lies in the fact that according to the invention the electric regenerative braking does not only provide additional energy savings but is also effective at relatively low speeds. This further reduces the use of conventional brakes in electric and hybrid vehicle particularly in start-stop scenarios common in city driving. Other than electric and hybrid vehicles, the system also finds application in conventional vehicles to achieve energy savings which can then be used for in-car electronics. For example, solid state air-conditioners allow the reuse of large amounts electrical energy obtained through regenerative braking. According to the invention the electric regenerative braking system also continues to uphold the other advantages of regenerative brakes like reducing the wear and tear of conventional brakes in automobiles, etc.

Another advantageous embodiment of the invention provides that the additional coils can be switched on and off cyclically. Within the scope of the invention, the additional coils are switched on for a time $t_{on}$ and off for a time $t_{off}$. In this manner, it is guaranteed that the current which flows through the additional coils can be limited. A switching off of the additional coils implies a weaker magnetic field, whereas a switching on of the additional coils results in a stronger magnetic field. A regulation of the magnetic field caused by the additional coils is thus possible.

Preferably, the additional coils can be switched on and off periodically during the braking, whereby the period is $t_p > 0$ and the duty cycle $t_{on}/t_p > 0$.

This being, it is provided within the scope of the invention that the switching on and off is pulsed.

In order to control the switching on and off procedure, a further advantageous embodiment of the invention provides that the electrical regenerative braking has a regenerative circuit which controls the switching on and off of the additional coils.

Within the frame of the invention the electrical regenerative braking is a single electromagnetic system. This means that an induction current produced by one coil is fed to the same electromagnetic system. Therefore in preferred embodiments of the invention of the present invention the electrical circuit is configured in that an induction current caused in the rotating brake coil flows through the additional coil and an additional coil is placed respectively around each pole of the magnet as well as the electrical circuit is closed by application of the braking.

It is known being a closed loop nature of the system the strength of the magnetic field continues to increase iteratively and correspondingly the current. Left to itself the system would generate an extremely high magnetic field, the situation may be referred to as a "magnetic runaway". The mentioned behaviour must be checked otherwise speed of the moving vehicle would reduce suddenly with a jerky motion. As a consequence of this the passengers of the vehicle may experience enormous braking force and in turn sudden deceleration. In order to circumvent this, according to another preferred embodiment the electrical circuit has a controller block which controls the current into the additional coils.

The intelligent controller is responsible for controlling the current in the feedback circuit. There are primarily two methods for achieving this. The first involves limiting the current in the additional coil in the using a FET (Field Effect Transistor) like device. The other alternative involves as mentioned switching a feedback circuit "ON" and "OFF" in rapid succession, similar to ABS mechanism. The pulse width and the duty cycle of the train of pulses used for switching the feedback circuit "ON" and "OFF" may be varied with time to obtain the desired result.

Furthermore the invention produces a method for braking a wheel for which a magnetic field is fed in a rotating braking coil by means of a magnet, whereby the magnetic field is reinforced by the additional magnetic field of additional coils, the inner space of which is provided with the magnet.

Additionally it is favourable if the magnetic fields are formed between poles of contrary names.

Additionally it is of advantage that an induction current caused in the rotating braking coil flows through the additional coils.

Furthermore it is advantageous that the current is controlled by means of a controller.

BRIEF DESCRIPTION OF THE DRAWINGS

The above and other features and advantages of the invention will be apparent from the following description of an exemplary embodiment of the invention with reference to the accompanying drawings, in which.

DESCRIPTION OF EMBODIMENTS

Figure 1A:
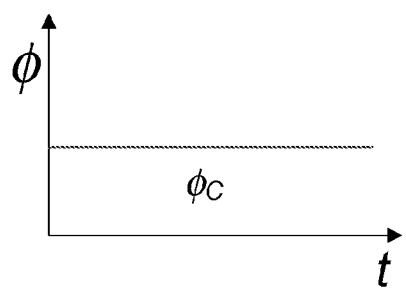
FIG. 1a-b show variation graphs in magnetic field through coils.

It may be observed that the magnetic field $\phi_c$ existing across the coils remains constant with time. This can be represented by the plot in FIG. 1a. Due to this reason the regenerative braking according to the state of the art is not effective it used at lower speeds. Also the energy savings obtained are suboptimal.

Figure 2:
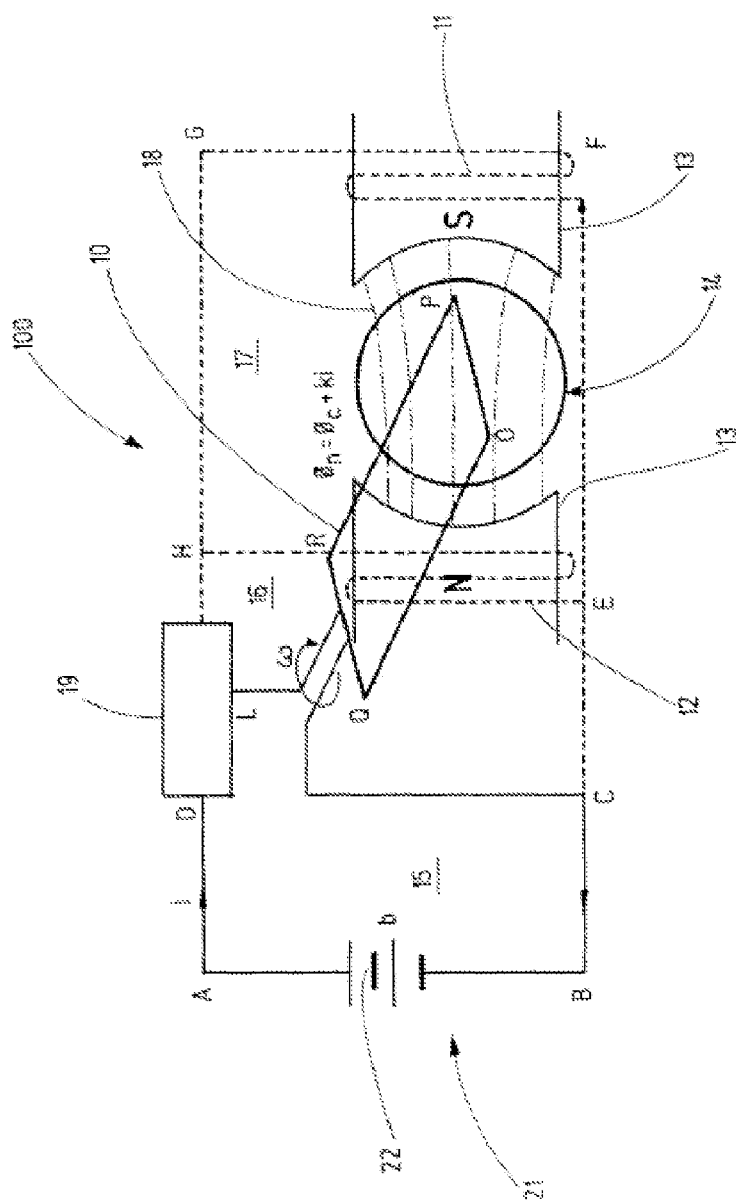
FIG. 2 shows an electric regenerative braking according to the invention.

To overcome these drawbacks of regenerative braking according to the state of the art, additional coils 11, 12 are placed around the permanent magnet 13 of the electrical regenerative braking 100 shown in FIG. 2. The braking 100 has an electric circuit 22 which contains the rotating brake coil 10 and the additional coils 11, 12 as elements.

According to Faraday's law an emf (Electro-motive force) is generated by the rotating brake coil 10, which is attached to a wheel 14 of the vehicle, due to the magnetic field $\phi_c$ of the permanent magnet 13. The magnetic field $\phi_c$ has the reference number 18. When the brakes are applied, assume that the points D and L become connected. Similarly assume that points H and L also become connected, leading to the formation of the circuits ADLCB, CEHL and CFGHL with the reference numbers 15, 16, 17. Currents are driven through the circuits 15, 16, 17 by the emf generated in the brake coils 10. Now, a part of the current through the brake coils 10 is driven through the additional coils 11, 12. Hence, these coils 11, 12 start acting like electromagnets. This results in an increase in the strength of the magnetic field 18 across the brake coil 10 according to the expression $$\phi_f = \phi_c + ki$$

where, $\phi_c$=strength of the magnetic field due to the magnet 13, k=proportionality constant, i=current through the braking coils 10.

The increase in the strength of the magnetic field 18 in turn generates a greater current in the braking coils 10, thus producing a greater charging current for the batteries I supercapacitors. At the same time a part of the brake coil 10 current i flows through the additional coils 11, 12. Therefore the magnetic field 18 across the braking coils 10 and the currents through the braking and additional coils 10, 11, 12 continues to increase in a cyclic manner. This leads to a continually increasing braking force on the braking coils 10 due to Lenz's law. Thus, the current in the additional coils 11, 12 need to be carefully controlled by the controller block 19 otherwise it may lead to a very large instantaneous braking force which may not be pleasant to the occupants of the vehicle.

In order to circumvent the above mentioned situation either of two policies may be adopted. The first involves limiting the peak current that is fed back to the additional coils 11, 12. The other alternative involves switching the feedback current to the additional coils 11, 12 'ON' and 'OFF' in rapid succession, analogous to ABS (Antilock Braking System) mechanism. The pulse width and the duty cycle of the train of pulses used for switching the feedback circuit 'ON' and 'OFF' may be varied with time to obtain the desired result based on the pressure applied on the brake pedal. Either of the above functions is performed by controller block 19 which is responsible for controlling the current in the feedback circuit and in turn the braking force. It is also responsible for deciding the combination of regenerative braking 100 and at conventional braking to use in a particular situation depending again the pressure applied on the brake pedal.

Another important function of the block 19 is to distribute the electrical energy generated through regenerative braking 100. Depending in the magnitude of the current regenerated part of it is provided as charging current to the battery/supercapacitor labelled "b" in FIG. 2, the remaining may be used in other electrical equipment of the vehicle.

For the purpose of the simulation the following simplifying assumptions have been made. However, these assumptions do not affect the generality of the solution. The braking coil 10 in FIG. 2 with its point OPQR has been assumed to compose of a single turn where OPQR is a square with unit dimension, therefore having unit area. The sides OQ and PR of the braking coil 10 is assumed to have a mass per unit length equal to unity, whereas sides OP and QR have been assumed to be massless.

Results presented in this description are from simulations carried out using Matlab/Simulink [in the MathWorks: htt:// www.mathworks.com] taking the wheel 14 as a stand alone system with the following parameters. A radial magnetic field was assumed across the brake coils with a unit wheel radius. The strength of magnetic field due to the permanent magnet $\phi_c$=0.1 Wb/m2. The constant 'k' takes into account both the fraction of the current i of the brake coil 10 in FIG. 2 that is channelled through the additional coils 11, 12 as well as the magnetic field produced due to it. The simulation results shown in FIG. 3 correspond to a value of k=0.04. However, this value has been chosen for just demonstrating the feasibility of the approach as well as highlighting certain associated phenomena. In practical cases a much higher values of k can be used in combination with the techniques for ensuring limited braking force on the vehicle.

Figure 3:
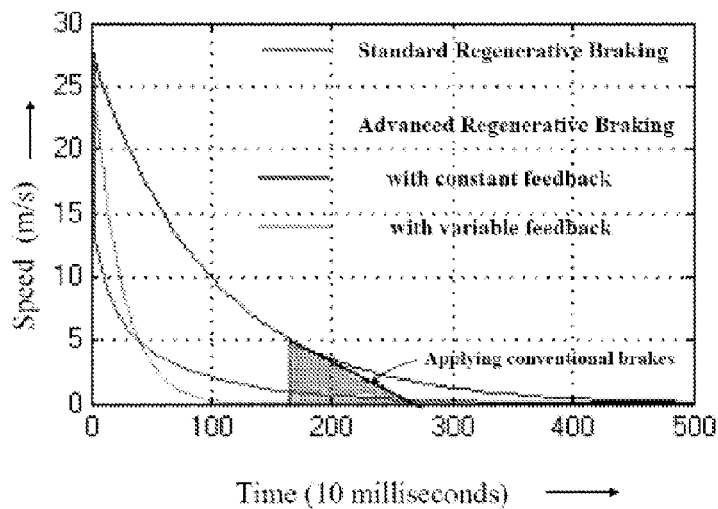
FIG. 3 shows deceleration curves during braking.

FIG. 3 shows the retardation curves for the different braking scenarios. The initial vehicle speed has been assumed to be 28 m/s which translates to around 100 km/hr. It can be observed from the FIG. 3 that conventional brakes need to be applied after sometime in the case of conventional regenerative braking, this reduces the energy savings. In case of constant unrestricted feedback a large deceleration is observed immediately after the application of the brakes. This is due to the surge in the braking force caused by feedback and is not desirable.

Figure 4:
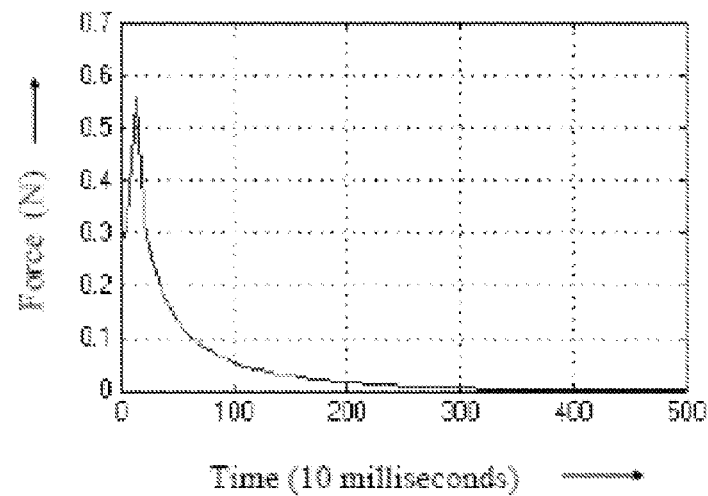
FIG. 4 shows the change in braking force with time.

FIG. 4 shows the variation in the braking force on a unit length of the brake coil (PR) for an unrestricted constant feedback system. On the other hand variable feedback does not suffer from the same. It can be implemented by rapidly varying the value of k, by pulsing the current in the additional coils 12, 13, to achieve effective braking as well as for increasing the energy savings. The energy savings may be visually represented by the shaded triangular area as shown in FIG. 3, bound on one side by the curve corresponding to a particular technique. For the simulation shown above the energy savings for the advanced regenerative braking scheme were 32.52% greater compared to conventional regenerative braking. FIG. 3 also shows that the scheme is capable of bringing the vehicle to almost a halt in the same time as that taken by the conventional regenerative braking system to reduce the speed of the vehicle by half.

Figure 1B:
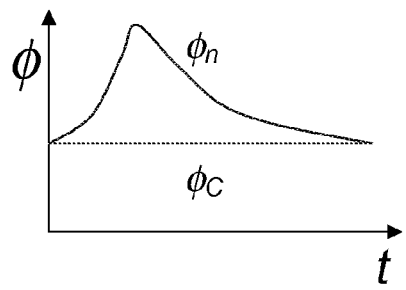

As mentioned, being a closed loop nature of the system it the strength of the magnetic field continues to increase iteratively and correspondingly the current. Left to itself the system would generate an extremely high magnetic field $\phi_c$, the situation may be referred to as a "magnetic runaway". The mentioned behavior must be checked otherwise speed of the moving vehicle would reduce suddenly with a jerky motion. This can be observed in FIG. 1b. As a consequence of this the passengers may experience enormous braking force and in turn sudden deceleration. In order to circumvent this, a controller block 19 has been proposed as shown in FIG. 2.

The controller block 19 is responsible for controlling the current in the feedback circuit. As mentioned there are primarily two methods for achieving this. The first involves limiting the current in the auxiliary circuit using a FET (Field Effect Transistor) like device. The other alternative involves switching the feedback circuit 'ON' and 'OFF' in rapid succession, similar to ABS mechanism (see FIG. 5). The period ($t_p$) and the duty cycle ($t_{on}/t_p$) of the train of pulses used for switching the feedback circuit 'ON' and 'OFF' may be varied with time to obtain the desired result.

A switching off of the additional coil results in that the magnetic field becomes weaker during a time $t_{off}$. A switching on of the additional coils results in turn in that the magnetic field increases again during a time $t_{on}$.

Figure 5:
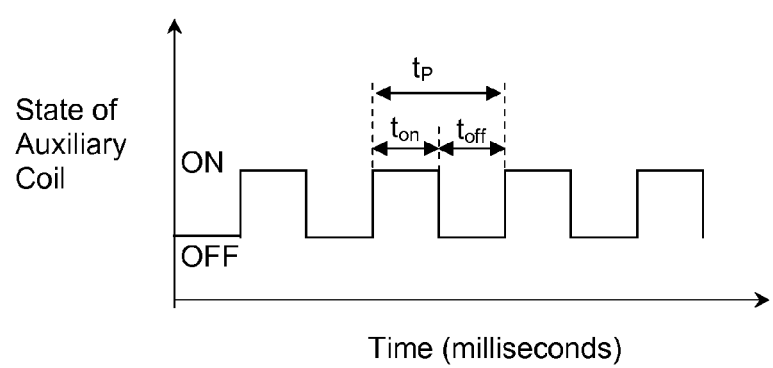
FIG. 5 shows a pulsed additional coil control mechanism.

The time sequence of the switching on and off of the additional coils which is represented in FIG. 5 thus shows a pulse diagram. The switching on and off of the additional coil can be controlled over a regenerative circuit integrated into the regenerative braking.

Figure 6:
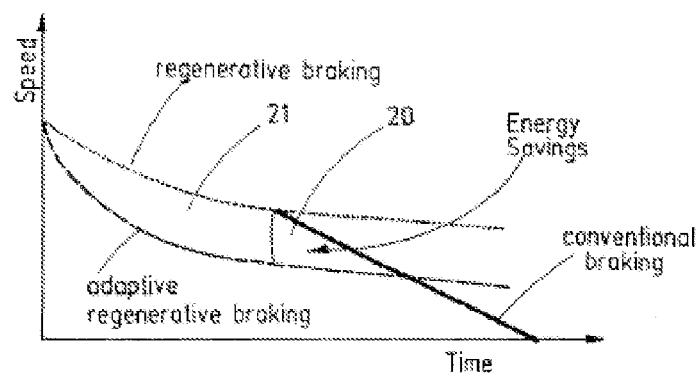
FIG. 6 shows a deceleration graph.

Since regenerative braking is only effective at high speeds, it is usually used in combination with conventional braking. A typical braking scenario is shown in FIG. 6. It is assumed that the brakes have been applied at time instance zero of the graph. Regenerative braking is used until the speed reduces below a certain threshold thereafter conventional brakes are used to bring the vehicle to a halt. In the case of the adaptive regenerative braking this critical speed is much less than that corresponding to the simple regenerative braking scheme. This leads to a significant saving in energy as shown by the region 20 in the graph in FIG. 6. Furthermore, the adaptive regenerative braking allows postponing the application of the conventional brakes. Hence, it provides for even greater energy saving (shown in region 21) and also reduces the wear and tear of the conventional brakes. It must be emphasized that at no point of time passenger safety is compromised. It may be observed that the vehicle comes to a halt within the same amount of time in both cases.

In a practical scenario the time required for coming to halt and the braking force applied to the wheel 14 is related to the pressure applied on the brake pedal by the driver. The controller block 19 in case of adaptive regenerative braking also takes that into account when adjusting the braking force being applied to the wheel 14. This is done by controlling the current in the feedback loop as previously mentioned.

REFERENCES 100 electrical regenerative braking
10 braking coil
11 additional coil
12 additional coil
13 magnet
14 wheel
15 circuit
16 circuit
17 circuit
18 magnetic field
19 controller block
20 region
21 region
22 circuit

The invention claimed is:

1. An electrical regenerative braking system, comprising:
a rotating brake coil which is mounted on a wheel of a vehicle, whereby a magnetic field of a magnet is applied to the coil, wherein the magnet producing the magnetic field is disposed in an inner space of at least one additional coil; and
an electric circuit which contains the rotating brake coil and the additional coils and controls a current in the additional coils producing a magnetic field applied to the rotating brake coil which affects regenerative braking as the rotating brake coil speed decreases.

2. An electrical regenerative braking system according to claim 1, wherein the current in the additional coils can be switched on and off cyclically during braking.

3. An electrical regenerative braking system according to claim 1, wherein a current in the additional coils can be switched on for a time $t_{on}$ and switched off for a time $t_{off}$.

4. An electrical regenerative braking system according to claim 3, wherein a current in the additional coils can be switched on and off periodically, whereby a period is $t_p>0$ and a duty cycle $t_{on}/t_p>0$.

5. An electrical regenerative braking system according to claim 2, wherein the switching on and off of the current is pulsed.

6. An electrical regenerative braking system according to claim 2, further comprising a regenerative circuit which controls the switching on and off of the current.

7. An electrical regenerative braking system according to claim 1, wherein the magnetic field is configured between two poles of contrary names of the magnet.

8. An electrical regenerative braking system according to claim 7, wherein the wheel is placed between two poles of contrary names.

9. An electrical regenerative braking system according to claim 1, wherein the magnet is a permanent magnet.

10. An electrical regenerative braking system according to claim 7, wherein an additional coil is placed respectively around each pole of the magnet.

11. An electrical regenerative braking system according to claim 1, wherein when the electrical regenerative braking system is applied, the electrical circuit is closed.

12. An electrical regenerative braking system according to claim 1, whereby the electrical circuit is configured in that an induction current caused in the rotating brake coil flows through the additional coils.

13. An electrical regenerative braking system according to claim 1, wherein the electrical circuit has a controller which controls the current through the additional coils.

14. An electrical regenerative braking system according to claim 13, wherein the controller is a transistor which limits the current through the additional coils.

15. Method for braking a wheel by:
applying a magnetic field of a magnet to a rotating braking coil; and
reinforcing the magnetic field with an additional magnetic field generated by additional coils, an inner space of which said additional coils contains the magnet to affect regenerative braking as the rotating brake coil speed decreases.

16. Method according to claim 15, wherein the magnetic fields are formed between poles of contrary names.

17. Method according to claim 15, wherein an induction current in the rotating braking coil flows through the additional coils.

18. Method according to claim 17, wherein the current is controlled by a controller.

19. Method according to claim 15, further comprising periodically switching the current through the additional coils on and off.

20. Method according to claim 19, wherein the switching on and off is pulsed.

* * * * *